United States Patent
Triebel et al.

(10) Patent No.: US 9,926,918 B2
(45) Date of Patent: Mar. 27, 2018

(54) ENERGY-RECUPERATING FLUID VIBRATION DAMPER

(71) Applicant: ZF FRIEDRICHSHAFEN AG, Friedrichshafen (DE)

(72) Inventors: Michael Triebel, Oberschwarzach (DE); Achim Thomae, Bergrheinfeld (DE); Helmut Baalmann, Bergrheinfeld (DE); Wilhelm-Heinrich Broocks, Kurnach (DE); Oswald Lichtlein, Bergtheim (DE); Steffen Heyn, Niederwerrn (DE); Andreas Förster, Schweinfurt (DE); Joachim Gajek, Wurzburg (DE); Robert Pradel, Rothlein (DE); Anke Sonnemann, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 419 days.

(21) Appl. No.: 14/413,652

(22) PCT Filed: Jun. 19, 2013

(86) PCT No.: PCT/EP2013/062680
§ 371 (c)(1),
(2) Date: Jan. 8, 2015

(87) PCT Pub. No.: WO2014/009115
PCT Pub. Date: Jan. 16, 2014

(65) Prior Publication Data
US 2015/0192114 A1     Jul. 9, 2015

(30) Foreign Application Priority Data
Jul. 9, 2012 (DE) .................. 10 2012 013 462

(51) Int. Cl.
*F03G 7/08* (2006.01)
*H02K 7/18* (2006.01)
*B60G 17/08* (2006.01)

(52) U.S. Cl.
CPC .............. *F03G 7/08* (2013.01); *B60G 17/08* (2013.01); *H02K 7/1876* (2013.01); *B60G 2300/60* (2013.01); *B60G 2500/10* (2013.01)

(58) Field of Classification Search
CPC . B61F 5/24; B61F 5/245; B60G 17/08; B60G 11/30; B60G 13/14; B60G 2300/60;
(Continued)

(56) References Cited

U.S. PATENT DOCUMENTS

| | | | |
|---|---|---|---|
| 6,519,939 B1 * | 2/2003 | Duff | F15B 1/265 60/473 |
| 2005/0252699 A1 * | 11/2005 | Schedgick | B60G 17/0152 180/41 |

(Continued)

FOREIGN PATENT DOCUMENTS

| | | | |
|---|---|---|---|
| DE | 102007026378 A1 * | 11/2008 | F16F 9/532 |
| DE | 102007026378 A1 * | 11/2008 | F16F 9/532 |

(Continued)

*Primary Examiner* — Robert A. Siconolfi
*Assistant Examiner* — San M Aung
(74) *Attorney, Agent, or Firm* — Cozen O'Connor

(57) ABSTRACT

Energy-recuperating vibration damper having a cylinder in which a displacer executes a limited operating movement in a working chamber so that a pressurized fluid is supplied to a fluid motor which drives a generator. A compensation chamber compensates for a change in volume of the pressurized fluid. A pressure accumulator is provided in addition to the compensation chamber, which pressure accumulator communicates with and is parallel-connected to the fluid motor.

8 Claims, 3 Drawing Sheets

(58) Field of Classification Search
CPC .... B60G 2500/10; F03G 7/08; H02K 7/1876;
F16B 11/10; F15B 15/02; F15B
2211/8613; F15B 2211/30565; F15B
2211/8616; F15B 2211/785; F15B
2211/7054; F15B 1/265; F15B 2201/00;
F16F 15/02; F16F 15/18; F16F 15/1447;
F16F 15/1457; F16F 9/32; F16F 9/34;
F16F 9/36; F16F 9/185; F16F 9/462
USPC .......................................................... 188/266
See application file for complete search history.

(56) References Cited

U.S. PATENT DOCUMENTS

| | | | | |
|---|---|---|---|---|
| 2007/0137913 | A1* | 6/2007 | Wohanka | B60G 11/56 180/197 |
| 2011/0187065 | A1* | 8/2011 | Van Der Knaap | B60G 17/0152 280/5.507 |
| 2011/0192157 | A1* | 8/2011 | Ogawa | B61F 5/245 60/469 |
| 2012/0305347 | A1* | 12/2012 | Mori | B60G 17/08 188/266.2 |

FOREIGN PATENT DOCUMENTS

| | | |
|---|---|---|
| DE | 10 2009 056 874 | 7/2010 |
| DE | 10 2011 101 746 | 3/2012 |
| JP | H02 306816 | 12/1990 |
| SU | 1097842 | 6/1984 |
| WO | WO 2009/060296 | 5/2009 |
| WO | WO 2010/115805 | 10/2010 |

\* cited by examiner

ENERGY-RECUPERATING FLUID VIBRATION DAMPER

CROSS REFERENCE TO RELATED APPLICATIONS

This is a U.S. national stage of application No. PCT/EP2013/062680, filed on Jun. 19, 2013. Priority is claimed on German Application No. DE102012013462.2, filed Jul. 9, 2012, the content of which is incorporated herein by reference.

BACKGROUND OF THE INVENTION

1. Field of the Invention

The invention is directed to an energy-recuperating fluid vibration damper.

2. Detailed Description of the Prior Art

Conventional vibration dampers such as those employed in a motor vehicle operate on the principle that kinetic energy due to external excitation is converted into heat by the displacement of a damping fluid through a choke. This heat is then dissipated via the wall of the vibration damper, possibly by making use of airflow. The great advantages of this constructional principle reside in the simplicity of the vibration damper and in the many years of experience in production technology.

However, this constructional principle also entails the drawback that the generated energy is dissipated without being used. For this reason, efforts have already been made over a long period of time to make use of the energy generated by the excitation of the vibration damper. WO 2009/060296 A2 describes a vibration damper in which a fluid flow drives a hydraulic motor connected to a generator. In this way, the energy generated from the excitation is available in the form of electric current.

WO 2009/060296 A2 further discloses an emergency operation function. When the pressure in the fluid line to the hydraulic motor increases, a parallel-connected pressure limiting valve opens.

The principle of operation has the drawback that the generation of electric energy is affected just as much by large changes in the piston rod velocity. Further, no solution is presented for the problem of excessive leakage in the hydraulic motor. With leakage of this kind, fluid could be pumped between the two working chambers by movement of the piston rod virtually without choking so that there would not be sufficient damping force.

SUMMARY OF THE INVENTION

It is an object of the present invention to minimize the problems known from the prior art.

According to one embodiment of the invention, a partial object is met in that a pressure accumulator is provided in addition to a compensation chamber, which pressure accumulator communicates with and is parallel-connected to the fluid motor.

The additional pressure accumulator absorbs the pressure fluctuations occurring when there are sudden changes in excitation and accordingly provides for a more uniform driving of the fluid motor. The mechanical loading of the fluid motor is also reduced in this way.

According to an advantageous embodiment, pressure fluid is prevented from flowing out of the pressure accumulator directly into the working chamber by at least one check valve. This has the advantage that the pressure accumulator does not empty and raises a vehicle body corresponding to an additional suspension force.

It is further provided that a steady state pressure in the additional pressure accumulator is greater than a working pressure at maximum usage of the compensation chamber. As a result of this step, the additional pressure accumulator does not serve as compensation chamber for all excitations on the vibration damper but rather compensates only for pressure peaks.

It is provided in one embodiment that a separate additional pressure accumulator is connected for each incident flow direction to the fluid motor. This affords the possibility of adapting the additional pressure accumulators to requirements independently from one another.

With respect to a construction of the vibration damper which economizes on installation space, the displacer is formed by a piston/piston rod assembly, the additional pressure accumulator being arranged inside this assembly.

The piston rod is constructed so as to be tubular and the additional pressure accumulator is arranged inside the piston rod. This variant allows a very large pressure accumulator volume.

Alternatively, the pressure accumulator can also be arranged inside the piston. This variant is particularly advantageous for providing installation space for connection of the fluid motor because lines or the like can be installed through the hollow piston rod.

A second partial object is met in that an emergency operation detection valve is arranged upstream of the fluid motor and supplies a fluid flow to a damping valve in case of emergency operation. The damping valve can be constructed as a conventional valve with valve disks so that a damping force characteristic suited to the vehicle can be provided.

Accordingly, the emergency operation detection valve is actuated by a control pressure which is proportional to an input pressure to the fluid motor.

Further, the emergency operation detection valve is actuated by a control pressure that is proportional to an output pressure of the fluid motor. For example, if there is excessive leakage, the emergency operation detection valve switches the fluid flow in direction of the damping valve.

All occurring pressure deviations at or in the fluid motor can be detected through a comparison of the two control pressures.

BRIEF DESCRIPTION OF THE DRAWINGS

The invention will be described in more detail referring to the following description of the drawings. In the drawings.

DETAILED DESCRIPTION OF THE PREFERRED EMBODIMENTS

Figure 1:
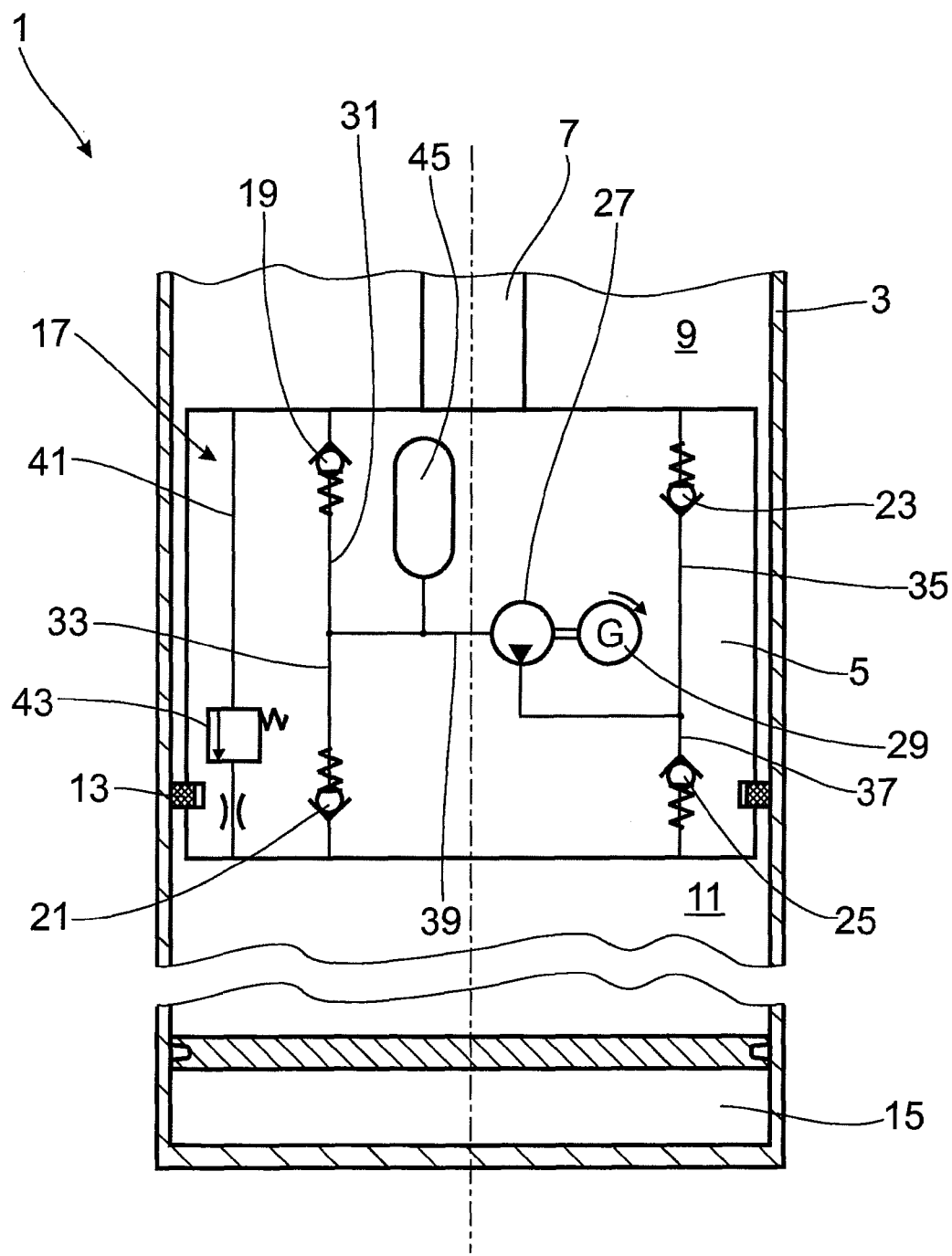
FIG. 1 is a vibration damper with an additional pressure accumulator.

FIG. 1 shows a schematic view of a vibration damper 1 having a cylinder 3 in which a displacer executes an axial operating movement. However, the invention is not limited to this constructional form. A piston/piston rod assembly serves as displacer, a piston 5 being fixedly connected to a piston rod 7. The piston 5 divides the cylinder into a working chamber 9 proximal to the piston rod and a working chamber 11 distal to the piston rod, the two working chambers 9; 11 being completely filled with a pressurized fluid, e.g., hydraulic oil. A piston seal 13 prevents overflowing over the sides of the piston 5. The volume displaced by the piston rod 7 is received by a compensation chamber 15 which possibly exerts a pressure pre-loading on the working chambers 9; 11 depending on the constructional form. In one embodiment, a dividing piston divides the compensation chamber 15 from the working chamber 11 proximal to the piston rod; however, other constructional forms 9; 11 are also possible.

FIG. 1 shows one embodiment in which piston 5 has a fluid line network 17 in which check valves provide for a rectification of the pressurized fluid flow to a fluid motor 27 which in turn drives a generator 29 for generating electric energy. The fluid line network 17 connects the two working chambers 9; 11 via two parallel-connected main lines. The two main lines comprise a supply line portion 31; 33 and an outlet line portion 35; 37. Check valves 19; 21 with an opening function to the fluid motor 27 are arranged in the supply line portions 31; 33. The outlet line portions 35; 37 have check valves 23; 25 with an opening function in direction of the working chambers 9; 11. The fluid motor 27 is incorporated in a connection line 39 between the two main lines.

A pressure limiting valve 43, which opens above a defined pressure level, prevents an overloading of the vibration damper 1 and is arranged in a parallel connection between the two working chambers 9; 11.

In addition to the compensation chamber 15, there is a pressure accumulator 45 connected on one side to the fluid motor 27 via connection line 39 and functionally parallel-connected to the fluid motor 27. The pressure at an input side of the fluid motor 27 is proportional to the pressure in the pressure accumulator 45. Flow of pressurized fluid out of the pressure accumulator 45 directly into one of the working chambers 9; 11 is blocked by the check valves 19; 21 and the fluid motor 27. Consequently, the pressure accumulator 45 cannot exert any lifting force on the piston rod 7. The pressure accumulator 45 is arranged inside the piston/piston rod assembly, for example. Depending on the installation space conditions and the dimensioning of the pressure accumulator 45, the piston rod 7 can be constructed to be tubular and the pressure accumulator 45 can be arranged inside the piston rod 7. However, it is also possible to place the pressure accumulator 45 directly in the piston 5.

The pressure level in the additional pressure accumulator 45 is adapted to a pressure level in the compensation chamber 15. Accordingly, a steady state pressure in the pressure accumulator 45 that occurs when the piston rod is stationary and at maximum usage of the compensation chamber 15, i.e., maximum compression, is greater than a working pressure prevailing in the compensation chamber 15 under these conditions.

During a compression of the working chamber 9 proximal to the piston rod due to an external excitation of the vibration damper 1, pressurized fluid is displaced via the opened check valve 19 into the supply line portion 31. At the same time, the check valve 21 in the supply line portion 33 is closed so that a direct connection between the two working chambers 9; 11 is blocked. The pressurized fluid flows from the supply line portion 33 to the fluid motor 27 and to the accumulator 45. If the excitation leads to a volume flow that is so large that the limit of the swallowing capacity of the fluid motor 27 is exceeded, the excess volume flows into the accumulator 45. If the volume flow decreases due to a slowing down of the piston rod movement, the pressure level in the pressure accumulator 45 decreases again in that pressurized fluid is supplied from the pressure accumulator 45 to the fluid motor 27 and flows off via the outlet line portion 37 into the working chamber 11 distal to the piston rod.

If the maximum storage volume of the pressure accumulator 45 is reached but there is still a critical pressure in the fluid line network 17, the parallel-connected pressure limiting valve 43 opens and unblocks the parallel connection 41. Pressure peaks inside the fluid line network are rectified by the pressure accumulator 45 and a more uniform running of the fluid motor 27 is accordingly achieved.

Figure 2:
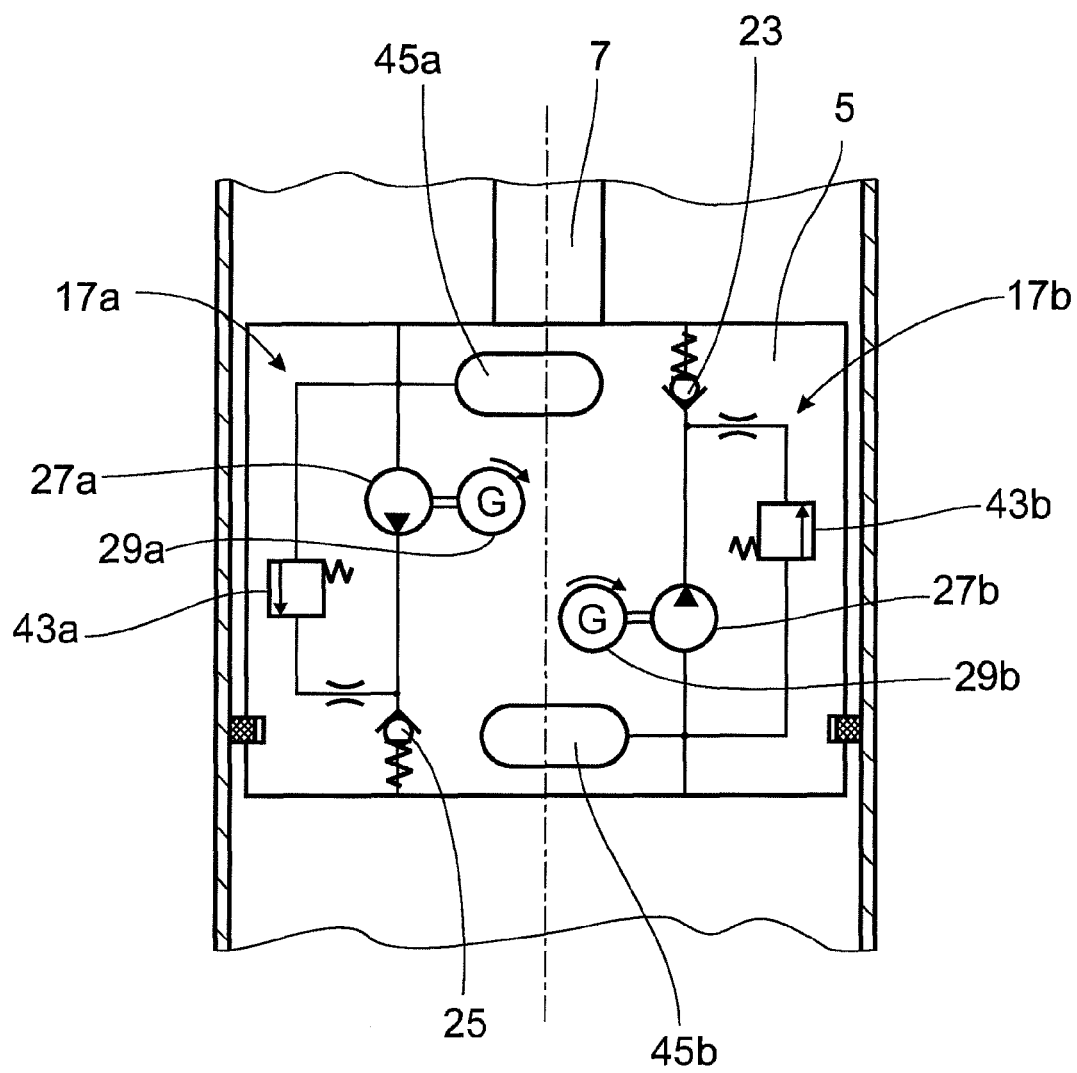
FIG. 2 is a vibration damper with an additional pressure accumulator for each working direction.

FIG. 2 shows a modification over FIG. 1 in which a separate pressure accumulator 45a; 45b is connected for each incident flow direction of the piston 5 or for each movement direction of the piston rod 7 with respect to the fluid motor 27a; 27b with the generators 29a; 29b. In this case, there are two completely separate fluid line networks 17a; 17b that have a separate pressure limiting valve 43a, 43b. Therefore, only one individual check valve 23, 25 is needed for each fluid line network 17a; 17b. The advantage of this constructional form consists in that the fluid motor 27a; 27b and, therefore, generation of electric energy, acquires a function dependent upon the movement direction of the piston rod 5.

Figure 3:
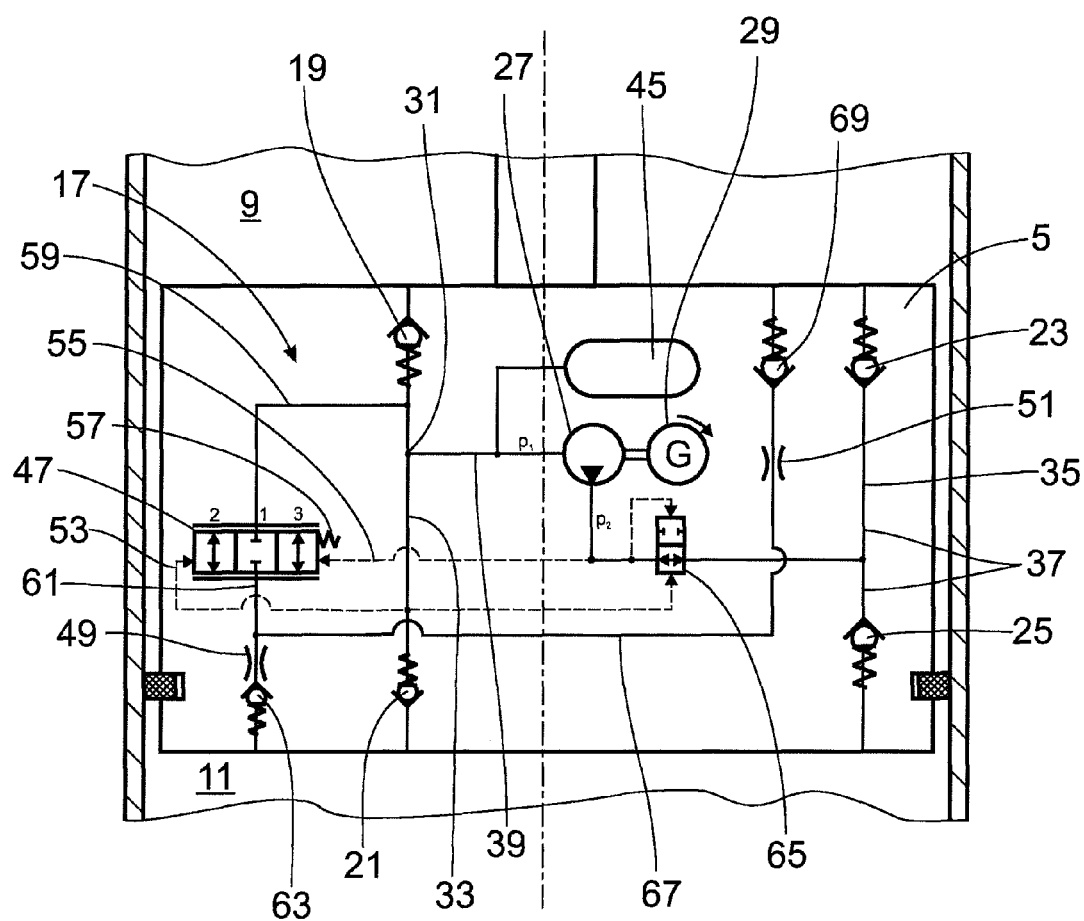
FIG. 3 is a vibration damper with an emergency operation detection valve.

FIG. 3 is a variant of FIG. 1. An emergency operation detection valve 47 constructed as a ⅔-way directional valve is incorporated in the fluid line network 17. The emergency operation detection valve 47 is arranged upstream of the fluid motor and supplies a fluid flow to a damping valve 49; 51 in case of emergency operation. Fixed orifices, known in general, combined with at least one valve disk serve as damping valves 49; 51, which provides a good damping force characteristic in the emergency operation condition.

The emergency operation detection valve 47 is actuated via a first control line 53 by a control pressure proportional to a fluid pressure $p_1$ to the fluid motor 27, i.e., to the fluid motor 27 on the input side. In correctly operating fluid motors 27, the input-side pressure $p_1$ at the fluid motor 27 is always greater than an output pressure $p_2$ from the fluid motor 27. A second control pressure is proportional to the output pressure $p_2$ and acts counter to the first control pressure via a second control line 55 at the emergency operation detection valve 47. An adjustment spring 57 stabilizes a normal operating setting 1 of the emergency operation detection valve 47 as is shown in FIG. 3.

When the piston moves in direction of the working chamber 9 proximal to the piston rod, pressurized fluid is supplied to the fluid motor 27 through the opened check valve 19 and the supply line portion 31. The input pressure $p_1$ is accordingly present at the fluid motor 27, at the additional pressure accumulator 45 and, via the first control line 53, at the emergency operation detection valve 47. When the fluid motor 27 and the additional pressure accumulator function as intended, the emergency operation detection valve 47 occupies the above-mentioned normal operation setting 1. A bypass line 59 proceeding from the supply line portions 31; 33 to the input connection of the emergency operation detection valve 47 is separated from an output connection. Accordingly, all of the displaced pressurized fluid flows through the fluid motor 27, possibly into the additional pressure accumulator 45. The vibration damper accordingly converts kinetic energy into electric energy via the fluid motor 27 in combination with the generator 29.

In the event that the fluid motor 27 is blocked the input-side pressure $p_1$ increases above a defined level to the output-side pressure $p_2$. The differential pressure $p_1$ minus $p_2$ acts at least proportionally on the emergency operation detection valve 47 which then occupies switching setting 2 and unblocks a first flow-off line 61 proceeding from the emergency operation detection valve 47 to the damping valve 49. A further check valve 63 opens and a flow connection is accordingly produced between the two working chambers 9; 11. In this switching setting of the emergency operation detection valve 47, the vibration damper 1 functions like a conventional fluid vibration damper.

In case of a leaky condition inside the fluid motor 27, the pressure drop in the fluid motor 27 is appreciably smaller than in normal operation. Consequently, the output-side pressure $p_2$ is relatively higher than in normal operation. A blocking valve 65 which is likewise actuated by the differential pressure $p_1$ minus $p_2$ is arranged between the output side of the fluid motor 27 and the two outlet line portions 35; 37 to prevent pressurized fluid from flowing out of the fluid motor 27 due to leakiness. The smaller pressure difference $p_1$ minus $p_2$ moves the emergency operation detection valve 47 into switching setting 3. The blocking valve 65 occupies the blocking setting because of the small differential pressure $p_1$ minus $p_2$. This prevents fluid from flowing out via the check valve 25. The pressurized fluid now also flows through the damping valve 49.

An identical function is achieved during a compression of the working chamber 11 distal to the piston rod. It is noted additionally that a second flow-off line 67 on the output side with respect to the emergency operation detection valve 47 leads to a second damping valve 51. The pressurized fluid flows through this working movement of the vibration damper via the check valve 21 into the fluid line network 17 and is available at the input side of the fluid motor 27. When the fluid motor 27 works as intended and the differential pressure $p_1$ minus $p_2$ is on a defined order of magnitude, the emergency operation detection valve 47 as well as the blocking valve 65 occupy the depicted switching position. In case of fluidic or mechanical blocking of the fluid motor 27, the input pressure $p_1$ is much greater than the output pressure $p_2$ at the fluid motor 17. Consequently, the emergency operation detection valve 47 changes to switching setting 2. The blocking valve 65 maintains its opened switching setting. The pressurized fluid in its entirety flows via the bypass line 59 through the emergency operation detection valve 47 and the second flow-off line 67 to the second damping valve 51.

In case of leakage in the fluid motor 17, the emergency operation detection valve 47 changes to switching setting 3 and the blocking valve 65 changes to the blocking setting. The pressurized fluid in its entirety then flows through the emergency operation detection valve 47 and further, via the second flow-off line 67, through the second damping valve 51 via a check valve 69 into the working chamber 9 proximal to the piston rod.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An energy-recuperating vibration damper comprising:
   a cylinder;
   a generator;
   a fluid motor that drives the generator;
   a displacer arranged in the cylinder that divides the cylinder into a first and second working chamber, the displacer configured to execute a limited operating movement so that a pressurized fluid is supplied to the fluid motor;
   a compensation chamber arranged in the cylinder that compensates for a change in volume of the pressurized fluid;
   at least one pressure accumulator that communicates with and is parallel-connected to the fluid motor; and
   an emergency operation detection valve arranged upstream of the fluid motor and configured to supply a fluid flow to a damping valve in case of emergency operation.

2. The energy-recuperating vibration damper according to claim 1, further comprising at least one check valve configured to prevent the fluid from flowing out of the pressure accumulator directly into at least one of the first and second working chambers.

3. The energy-recuperating vibration damper according to claim 1, wherein a steady state pressure in an additional pressure accumulator is greater than a working pressure at maximum usage of the compensation chamber.

4. The energy-recuperating vibration damper according to claim 1, wherein a respective pressure accumulator is connected for each incident flow direction to the fluid motor.

5. The energy-recuperating vibration damper according to claim 1, wherein the displacer is a piston/piston rod assembly and an additional pressure accumulator is arranged inside this assembly.

6. The energy-recuperating vibration damper according to claim 5, wherein the piston rod is tubular and the additional pressure accumulator is arranged inside the piston rod.

7. The energy-recuperating vibration damper according to claim 1, wherein the emergency operation detection valve is actuated by a control pressure that is proportional to an input pressure p1 to the fluid motor.

8. The energy-recuperating vibration damper according to claim 1, wherein the emergency operation detection valve is actuated by a control pressure that is proportional to an output pressure p2 of the fluid motor.

* * * * *